United States Patent [19]

Bolto et al.

[11] 4,246,355

[45] Jan. 20, 1981

[54] ION EXCHANGE PROCESSES AND PRODUCTS

[75] Inventors: Brian A. Bolto, Mitcham; David R. Dixon, Keilor; Robert J. Eldridge, Moorabbin, all of Australia

[73] Assignee: ICI Australia Limited, Melbourne, Australia

[21] Appl. No.: 864,474

[22] Filed: Dec. 27, 1977

[30] Foreign Application Priority Data

Jan. 7, 1977 [AU] Australia .............................. 8692/77

[51] Int. Cl.$^3$ .............................................. C08J 9/00
[52] U.S. Cl. .................................... 521/38; 210/425; 210/679
[58] Field of Search ................. 260/2.2 R, 2.1 E, 877, 260/37 M; 210/36, 425; 526/9, 883, 57, 40, 80, 86; 521/38

[56] References Cited

U.S. PATENT DOCUMENTS

| 2,642,514 | 6/1953 | Herkenhoff | 260/37 M |
|---|---|---|---|
| 2,837,496 | 6/1958 | Vandenberg | 521/38 |
| 2,876,133 | 3/1959 | Iler et al. | 260/42.53 |
| 2,911,398 | 11/1959 | Vandenberg | 526/57 |
| 2,965,572 | 12/1960 | Wuellner et al. | 260/877 |
| 3,247,133 | 4/1966 | Chen | 260/877 |
| 3,458,597 | 7/1969 | Jabloner | 260/877 |

FOREIGN PATENT DOCUMENTS

| 66221 | 6/1974 | Australia | 210/425 |
|---|---|---|---|
| 1456974 | 12/1976 | United Kingdom | 526/103 |

OTHER PUBLICATIONS

Bolto, et al., Journal of Applied Polymer Science, vol. 22, 1978-pp. 1978-1982.

Primary Examiner—Joseph L. Schofer
Assistant Examiner—Peter F. Kulkosky
Attorney, Agent, or Firm—Cushman, Darby & Cushman

[57] ABSTRACT

Processes for making copolymers comprising treating a reaction mixture of a monomer and a substrate comprising ferromagnetic material located in a polymeric matrix so as to polymerize the monomer in a manner that it forms a polymeric shell grafted on to and surrounding the substrate, the polymerization of the monomer being initiated by adding the components of a redox system sequentially to the reaction mixture.

12 Claims, No Drawings

ION EXCHANGE PROCESSES AND PRODUCTS

This invention relates to graft copolymers and to processes whereby such copolymers can be prepared. More particularly the invention relates to copolymers comprising a ferromagnetic component, especially such copolymers wherein a polymeric substrate is surrounded by a shell of copolymeric material.

It is known that copolymers may be prepared by processes whereby a copolymer is grafted on to a polymeric substrate such as starch or cellulose. Typically a redox system may be used to initiate such graft copolymerization and hitherto it has been common practice to add all the components of the redox system to the reaction mixture simultaneously.

We have now found that functional monomers may be graft polymerized on to substrates comprising ferromagnetic material located in a polymeric matrix by a process wherein the graft polymerisation is initiated by a redox system and wherein the components of the redox system are incorporated into the reaction mixture separately instead of simultaneously as has hitherto been taught in the prior art relating to graft polymerisation.

Accordingly we provide a process for the manufacture of a copolymer which process comprises treating a reaction mixture comprising at least one functional monomer and particulate substrate material comprising ferromagnetic material located in a polymeric matrix so as to polymerize said monomer in a manner such that it forms a polymeric shell which is grafted on to and surrounds said substrate and wherein the polymerization of said monomer is initiated by adding sequentially to said reaction mixture the components of a redox system.

The choice of the compounds of redox systems which are suitable for use in the process of the invention is comparatively limited. Suitable systems contain as the oxidizing component peroxide compounds such as hydrogen peroxide, and as the oxidizable component a ferrous compound is used. In the course of our experimentation we have found that several redox systems are unsuitable for use in the process of the invention. Such redox systems include combinations of hydrogen peroxide and manganous salts; hydrogen peroxide and cuprous salts; Cerium$^{IV}$ salts/water mixtures; $K_2S_2O_8$/cupric salt mixtures; or $K_2S_2O_8$/$Na_2S_2O_5$ mixtures. One useful redox system which is preferred comprises hydrogen peroxide suitably in the form of an aqueous solution, and ferrous salt material such as ferrous sulphate and it is convenient to introduce the peroxide component into the reaction mixture, prior to introducing the ferrous component into the reaction mixture.

So as to facilitate the understanding of the invention a redox system comprising an aqueous solution of hydrogen peroxide and a ferrous salt, such as ferrous sulphate, will be used as an example of a typical and preferred redox system in the description which follows. In general terms the process of the invention may be performed suitably by the following steps:

1. Activate the substrate with an excess of aqueous hydrogen peroxide solution;
2. Wash the activated substrate with water so as to remove excess hydrogen peroxide and to form an aqueous slurry of the activated (peroxidised) substrate;
3. Add the monomer and ferrous salt to a stirred aqueous slurry of the activated substrate and react these materials so as to form a copolymeric product;
4. Wash the copolymeric product firstly with acid and/or alkali, and secondly with water to purify the copolymeric product;
5. Recover the copolymeric product in a dry form.

Suitable materials which may be used in the substrate as ferromagnetic materials include soft or hard ferrites, or material which exhibits reversible magnetism such as gamma-iron oxide, magnetite or chromium dioxide. The ferromagnetic material obviously must be of particle size smaller than the polymeric particles in which it is embedded and conveniently is of a size in the range from 0.1 to 5000 microns, often in the range from 0.1 to 500 microns and more often from 0.5 to 40 microns. Certain suitable ferromagnetic materials such as for example mill scale are expensive to grind to the desired degree of fineness. Magnetic iron oxides, by contrast, are simple to prepare as fine powders and are therefore convenient to use where a reversible ferromagnetic material is required. Iron oxides such as $Fe_2O_3$ or $Fe_3O_4$ are examples of suitable ferromagnetic materials. $\gamma$-$Fe_2O_3$ is a particularly preferred ferromagnetic material.

The ferromagnetic substrates used in the process of the invention may be prepared by methods known in the art. Suitable methods which may be mentioned include the following. The magnetic material may be dispersed in a monomer or monomer mixture which may then be polymerized to give the required particulate substrates. Another method is to compound a mixture of a polymer and magnetic material together by a milling operation. The finely ground mixture may then be granulated to give material of the desired size range. In yet another method magnetic material may be dispersed in a solution of liquid polymers which may then be crosslinked in a curing process. Another method is to deposit a polymer on to magnetic material by polymerization from the vapour phase by any suitable method known in the art. A polymer may also be precipitated from a solution onto a dispersion of magnetic particles so as to encapsulate them. Methods for encapsulation are known in the art. The proportion of ferromagnetic material in the substrates is conveniently at least 40% w/w of the substrate, and for many purposes it is in the range from 60 to 80% w/w of the substrate. The size of the substrate particles will vary dependent on the purpose to which the copolymer made by the process of the invention is to be put and will be somewhat less in size than the size of the copolymer particles. Thus for example we have found that relatively coarse copolymer particles are best for certain applications such as purification of substances by fixed bed treatments and in this instance the copolymers are suitably substantially spherical and of diameter in the range from 500 to 5000 microns. For other purposes such as flocculation treatments or in continuous ion exchange processes the average size of the copolymeric particles is conveniently in the range from 0.1 to 500 microns overall in the largest dimension of the particles and more preferably is in the range from 5 to 300 microns.

Suitable substrates include those comprising magnetic iron oxides, such as gamma iron oxide located in a polymeric matrix. The polymeric material from which the matrix may be formed should be one which is amenable to treatment which is conducive to the formation of free radicals on the surface of the matrix from which the grafted shell component may be developed. Preferably it should be amenable to processes whereby it may be shaped, preferably into a spherical or quasi-spherical configuration. Thus thermoplastic polymers are suitable because of the ease from which spheres may be formed therefrom, but thermosetting polymers are not excluded. From amongst polymeric materials suitable for use as components of the matrix mention is made of polymers or copolymers derived from acrylamide or comprising polyvinyl alcohol. Although the matrix may be formed from unmodified polymeric materials it may be desirable to increase the physical strength of the matrix made from certain polymers or for using the matrix under certain adverse conditions by crosslinking the polymeric material at least in part. A typical example of such a crosslinked polymeric material from which a matrix may be formed is polyvinyl alcohol which has been crosslinked by treating it with a conventional crosslinking agent such as a dicarboxylic acid, a diisocyanate or a dialdehyde for example glutaraldehyde. Glyoxal is another crosslinking agent which may be used and this agent is particularly efficacious when the matrix comprises polyacrylamide as a component.

The nature of the functional monomer used in the process is not narrowly critical and is dependent on the nature and conditions of use of the copolymer made by the process. Monomers of the nonionic type as well as acidic and basic monomers are suitable for use in the process of the invention. Examples of suitable monomers and derivatives thereof include acrylamide, vinyl acetate, vinylbenzyl chloride, methyl acrylate, ethyl acrylate, acrylic acid, methacrylic acid, 2-vinylpyridine, 4-vinylpyridine, 2-methyl-5-vinylpyridine, 3-dimethylaminopropylacrylamide, 2-dimethylaminoethyl methacrylate, 2-diethylaminoethyl methacrylate, aminostyrene, ethylaminomethylstyrene, diethylaminomethylstyrene, 1-ethyl-4-vinylpyridinium-p-toluene sulphonate, 2-hydroxy-3-methacrylyloxypropyl-trimethylammonium chloride, 2-methacrylyloxyethyltrimethylammonium methylsulphate, vinyl benzyl sulphonic acid, or vinylbenzyl trimethylammonium chloride. The thickness of the shell of grafted copolymer derived from the functional monomer will depend to some extent on the size of the substrate and the purpose for which the copolymer is to be used. In the instance where the substrate is spherical or quasispherical the thickness of shell graft is conveniently up to 25% of the diameter of the substrate and more usually from 3 to 15%, to provide copolymeric particles which are essentially spherical in shape.

The functional copolymeric grafted component may be modified after it has been located on the substrate component of the copolymers made by the process of the invention. Thus for instance weakly acidic components such as those derived from acrylic acid may be converted to other forms by suitable treatment of the copolymer. Typical examples of methods whereby a modified copolymer may be prepared in a further embodiment of the invention include (a) esterification of a weakly acidic component such as for example the esterification of at least part of a component derived from acrylic acid using isethionic acid and removal of the generated water by azeotropic distillation;

(b) reacting a weakly acidic copolymeric component with a quaternary ammonium salt such as glycidyltrimethylammonium chloride to form a strong base derivative of the component;

(c) reacting a weakly acidic copolymeric component with a mixture of an amine such as diethylamine and epichlorhydrin to form a weak base derivative of the component;

(d) converting the component to form amine derivatives of the component, such as for example treating a copolymer comprising a graft of polyacrylamide with an excess of sodium hypochlorite to form an amine derivative of the component.

Accordingly in an embodiment of the invention we provide a process for the manufacture of a copolymer, said process being as hereinbefore described and comprising additionally treating the polymeric shell so as to convert it to a modified form.

The mechanism of the process of the invention whereby copolymers may be prepared is not understood and it is most surprising that the use of a redox system comprising a peroxide and a ferrous salt should be capable of providing the desired copolymeric materials when other redox systems referred to hereinbefore are ineffective for that purpose. The process of the invention is useful in that it provides a means whereby a functional polymer may be located by chemical initiating means on to a substrate containing ferromagnetic material and thereby avoids the need to use on a commercial scale a process involving the use of expensive and difficult to use ionizing radiation.

In view of the unexpectedness of the process of the invention it is considered that the copolymers made by the process are novel and accordingly in an embodiment of the invention there is provided a copolymer comprising first a substrate containing ferromagnetic material located in a polymeric matrix, and secondly a polymeric shell grafted on to and surrounding said substrate, said shell being derived from at least one functional monomer the polymerisation of which is initiated by adding sequentially to a mixture comprising said substrate and said monomer the components of a redox system, said redox system being characterised in that it comprises as a first component hydrogen peroxide and as a second component ferrous salt material.

These copolymers obtained by the process of the invention are useful for purifying aqueous media, such as brackish water or effluents from factories by methods of ion exchange, or for removing from aqueous media algae, colour-causing organic materials or colloidal inorganic materials such as clay. They are also useful in the protection of thermally regenerable ion exchange resins such as those of the so called "Sirotherm" (Registered Trade Mark) type from the effects of foulant substances.

The invention is now illustrated by, but is not limited to, the following examples wherein all parts and percentages are on a weight basis unless otherwise specified.

EXAMPLE 1

This is an Example of the preparation of a ferromagnetic polymeric particle of use in our invention as a substrate.

A dispersion of gamma-iron oxide was prepared as follows: 8.4 kilograms of "Bayer S11 gamma-iron oxide" (Trade Mark for a gamma iron oxide) was added to a solution of 0.43 kilogram of "Teric" PE68 (Trade Mark for an alkylene oxide condensate) and 2.76 kilograms of "Gelvatol 20-30" (Trade Mark for a polyvinyl alcohol) in 21.1 liters of water and the suspension was stirred until it consisted of clusters of iron oxide particles smaller than 1 micron. To the above suspension there was added with rapid stirring 6.6 kilograms of an aqueous 25% solution of glutaraldehyde and 1.65 liters of 0.5 molar HCl and the product so obtained was dispersed immediately into 105 liters of σ-dichlorobenzene to which had been added 4.2 kilograms of "Span 85" (Trade Mark for sorbitan trioleate). Vigorous stirring was continued for one hour followed by gentle agitation for about 2 hours. The product was filtered off, washed with acetone until the filtrate was clear. The particles so obtained were dried and cured for 1 hour at 100° C. 10 kilograms of particles were obtained with an average size of 100 microns and containing 70% w/w of gamma-iron oxide.

EXAMPLE 2

The general procedure of Example 1 was repeated except that the iron oxide of that example was replaced by a soft ferrite available commercially under the registered trade mark of "Ferrox Cube 3E". There was thus obtained a particulate substrate containing about 50% w/w of soft ferrite.

EXAMPLE 3

The general procedure of Example 1 was repeated except that the iron oxide of that example was replaced by a hard ferrite available commercially under the registered trade mark of "Black iron oxide" 318M. The substrate particles so obtained contained about 40% w/w of hard ferrite.

EXAMPLE 4

5 parts of the ferromagnetic polymeric particles prepared as set out in Example 1 were stirred with 15 parts by volume of 100 volume hydrogen peroxide solution for 15 minutes. The activated substrate so obtained was separated by filtration means, washed with water so as to remove excess hydrogen peroxide and added to 100 parts by volume of an aqueous solution containing 0.3 part of hydrated ferrous sulphate and 18 parts of acrylic acid. The resultant mixture was stirred for 60 minutes at room temperature during which time a shell of poly(acrylic acid) was grafted on to and surrounded the substrate. The resin so obtained when separated from the reaction mixture, washed so as to remove impurities and used as an ion-exchange resin was found to have an ion-exchange capacity of 4.2 milliequivalents per gram of resin.

EXAMPLE 5

5 parts of ferromagnetic polymeric particles which were substantially spherical and had diameters in the range from 15 to 150 microns, and which had been made by a method as generally set out in Example 1 and which contained 70% w/w of gamma $Fe_2O_3$ was stirred with 50 parts by volume of an aqueous solution containing 30% hydrogen peroxide for 30 minutes, after which time the activated substrate so obtained was separated by filtration means, washed with water so as to remove excess hydrogen peroxide and added with stirring to 100 parts by volume of slightly acidulated water. To the slurry so obtained there was then added 0.3 part of hydrated ferrous sulphate and 27 parts of acrylic acid. The resultant mixture was stirred at room temperature for 30 minutes during which time a shell of poly(acrylic acid) was grafted on to and around the substrate. The product so obtained was separated from the mixture and washed to remove impurities. When used as an ion-exchange resin it had an ion-exchange capacity of 5.1 milliequivalents per gram of resin.

EXAMPLE 6

The general procedure of Example 5 was repeated except that the amount of ferrous sulphate was reduced to 0.05 part, the amount of acrylic acid was decreased to 9 parts and the final stirring time was increased from 30 to 60 minutes. The copolymeric product so obtained had an ion-exchange capacity of 1.8 milliequivalents per gram of product.

EXAMPLE 7

An amount of a copolymer prepared by the general procedure of Example 5 and having an ion-exchange capacity of 6.1 milliequivalents per gram when used as a weak acid ion-exchange resin and containing 61 millimoles of poly(acrylic acid) was reacted with 61 millimoles of glycidyltrimethylammonium chloride by heating the materials in boiling 1-propanol for four hours. The product so obtained when separated from the reaction mixture and washed was found to be a strong base ion-exchange resin having an ion-exchange capacity of 0.9 milliequivalent per gram.

EXAMPLE 8

10 grams of a weak acid ion-exchange resin prepared by the general procedure of Example 5 and having an ion-exchange capacity of 6.1 milliequivalents per gram and containing 61 millimoles of poly(acrylic acid) was refluxed with 648 millimoles of epichlorhydrin and 715 millimoles of diethylamine in 200 milliliters of 1-propanol for 4 hours. The separated and washed product acted as a weak base ion-exchange resin and as such had an ion-exchange capacity of 2.6 milliequivalents per gram of resin. It was also useful in removing colour from the effluent issuing from a paper mill.

EXAMPLE 9

40 parts of substrate material in the form of spherical particles having diameters in the range from 66 to 100 microns and comprising 70% w/w of $Fe_3O_4$ located in a matrix of crosslinked polyvinyl alcohol were stirred at 75 revolutions per minute with 120 parts by volume of 100 volume hydrogen peroxide solution for 10 minutes. The activated substrate so obtained was separated by filtration means, washed with water so as to remove excess hydrogen peroxide, and added to 800 parts by volume of an aqueous solution containing 2.4 parts of $FeSO_4 7H_2O$ and 120 parts of acrylamide. The resultant mixture was stirred for three hours during which time a shell of polyacrylamide was grafted on to and around the substrate. The copolymeric product so prepared when separated from the reaction mixture and washed provided 68 parts of a composite polymer containing 6.3 millimoles of acrylamide units per gram. The product was useful as a flocculant aid.

EXAMPLE 10

10 grams of a copolymer prepared by a general procedure as described in Example 9 and containing 66 millimoles of a grafted shell of polyacrylamide was treated in a 10% aqueous sodium hydroxide solution with 82 millimoles of sodium hypochlorite in the form of an aqueous solution. The reactants were mixed for two hours at a temperature of 0° C. to provide a copolymer of the amine type and which had a capacity of 1.46 milliequivalents per gram.

EXAMPLE 11

10 parts of a matrix in the form of spherical particles made by the general procedure of Example 3 and having diameters in the range from 43 to 61 microns were stirred with 40 parts by volume of 100 volume hydrogen peroxide solution for 15 minutes. The activated substrate so obtained was separated by filtration means, washed with water so as to remove excess hydrogen peroxide and was then added to a mixture of 200 parts by volume of an acidic solution containing 0.075% w/v $FeSO_4 7H_2O$ and 20 parts of 2-hydroxy-3-methacrylyloxypropyltrimethylammonium chloride. The resultant reaction mixture was stirred at room temperature for two hours during which time a copolymeric shell was grafted on to and around the substrate. The product was separated and washed to yield 16.7 parts of a resin having an ion-exchange capacity of 1.7 milliequivalents per gram. The product was suitable for use as a decolourizing agent in the treatment of effluents from paper mills and for removing turbidity from river water.

EXAMPLE 12

20 parts of a substrate comprising crosslinked polyvinyl alcohol particles containing 70% of $Fe_3O_4$ were dispersed in 100 parts of 100 volume hydrogen peroxide solution for 30 minutes. The activated substrate so obtained was separated from the mixture by filtration means, washed with water so as to remove excess hydrogen peroxide and was then added to a dispersion of 40 parts by volume of vinyl acetate in an aqueous solution prepared by dissolving 0.6 part of $FeSO_4 7H_2O$ in 400 parts by volume of slightly acidulated water. The resultant mixture was stirred at room temperature for two hours and the copolymer so obtained was then separated from the mixture, washed with water and alcohol to give 25.8 parts of a copolymer containing 2.6 millimoles of vinyl acetate units per gram and wherein polyvinyl acetate is grafted as a shell on to a magnetic polymeric substrate.

EXAMPLE 13

The general procedure of Example 5 was repeated except that the amount of ferrous sulphate was increased to 0.56 part and the acrylic acid of that example was replaced by 32 parts of methacrylic acid. The copolymer so obtained had a shell of poly(methacrylic acid) surrounding the substrate and had an ion-exchange capacity of 2.5 milliequivalents per gram.

EXAMPLE 14

A weak base ion-exchange resin having a capacity of 0.9 milliequivalent per gram was prepared by treating 2 parts of a substrate prepared as in Example 1 with an aqueous solution of hydrogen peroxide so as to activate it, and then washing it to remove the excess hydrogen peroxide. It was then added to and stirred with 20 parts of an aqueous solution at a temperature of 0° C. and which was 3.5 molar with respect to 4-vinylpyridine hydrochloride and had a pH value of 1.7. The solution also contained 0.06 part of $FeSO_4 7H_2O$. Stirring was continued for 2 hours and after this time the resultant copolymeric product was separated from the reaction mass and converted to a free base form in the shape of a shell graft surrounding a substrate. The product so obtained was useful as a flocculating agent in the purification of river water.

EXAMPLE 15

A weak base ion-exchange resin was prepared by the general procedure of Example 14 except that the 4-vinylpyridine hydrochloride was replaced by an equivalent molar amount of 2-vinylpyridine hydrochloride. The resulting copolymer had an ion-exchange capacity of 0.04 milliequivalent per gram.

EXAMPLE 16

The general procedure of Example 4 was repeated except that the substrate of that Example was replaced by a substrate in which the particles had sizes in the range from 100 to 300 microns and contained 50% of gamma iron oxide. The magnetic resin had an ion-exchange capacity of 4.5 milliequivalents per gram.

EXAMPLE 17

The general procedure of Example 16 was repeated except that the substrate of that Example was replaced by particles having sizes in the range from 30 to 200 microns. The magnetic weak acid resin so obtained had an ion-exchange capacity of 4.3 milliequivalents per gram. It was useful as an ion exchange component of a dealkalization plant which ran continuously over a prolonged period during which time feedwaters to and effluent from the liming stage of a physico-chemical sewage treatment plant were purified.

EXAMPLES 18 TO 23 INCLUSIVE

These examples illustrate the large scale preparation of magnetic carboxylic acid resins using a range of substrates and stirring speeds. In general terms the resins were made by the following method. 4000 grams of substrate, in the form of substantially spherical beads made by encapsulating gamma iron oxide ($Fe_2O_3$) in a matrix of nominally 100% crosslinked polyvinyl alcohol so that the iron oxide constituted about 70% of the substrate, and 10 liters of 100 volume hydrogen peroxide solution were stirred for 30 minutes and the activated substrate was placed on a filter and washed with water to remove excess hydrogen peroxide. 32 liters of water was added to the activated substrate, followed by 120 grams of $FeSO_4 7H_2O$ and 6000 grams of acrylic acid (containing 500 parts per million on of hydroquinone methyl ether as inhibitor) in a stainless steel reactor. The resultant slurry was stirred for 30 minutes at speeds as tabulated below. The crude copolymeric product so obtained was then placed on a filter, separated from the reaction medium and washed with alkali, acid and water to remove impurities from the desired copolymeric product which was then dried. The ion-exchange capacity and thickness of grafted polymeric shell of a range of such copolymers is tabulated below in Table 1.

TABLE 1

| Ex. No | Particle sizes of substrate (microns) | Stirring speed (revolutions per minute) | Shell thickness (microns) | Ion exchange capacity (milliequivalents per gram |
|---|---|---|---|---|
| 18 | <43 | 250 | 3.5 | 5.51 |
| 19 | 43 to 124 | 300 | 10.2 | 5.81 |
| 20 | 124 to 208 | 300 | 16.0 | 4.84 |
| 21 | 208 to 315 | 250 | 18.5 | 3.84 |
| 22 | 315 to 400 | 400 | 23.0 | 3.70 |
| 23 | 400 to 600 | 400 | 20.0 | 2.45 |

EXAMPLE 24

A dispersion of gamma-iron oxide was prepared by milling 230 parts of the iron oxide used in Example 1 with 12 parts of "Teric" PE68 and a solution of 100 parts of polyacrylamide in 4000 parts of water. To 1500 parts of the above suspension there was added with stirring 13 parts of glyoxal and the mixture so obtained was dispersed into 20000 parts of $o$-dichlorobenzene to which had been added 400 parts of a copolymer comprising mer units of ethylacrylate and 2-hydroxyethyl methacrylate in a molar ratio of 10:1. The dispersion so obtained was acidified by the addition thereto of hydrochloric acid and by this means the dispersion was converted to a gelled substrate. Using the general procedure of Example 9 270 parts of the above substrate were reacted with a solution containing 16 parts of $FeSO_4$·7-$H_2O$ and 810 parts of acrylamide to provide 290 parts of a copolymeric product comprising a shell of polyacrylamide grafted on to and around the substrate and useful as an ion-exchange resin for the purification of factory effluents.

We claim:

1. A process for the manufacture of a copolymer which process comprises treating a reaction mixture comprising at least one functional monomer and particulate substrate material comprising ferromagnetic material located in a polymeric matrix so as to polymerize said monomer in a manner such that it forms a polymeric shell which is grafted on to and surrounds said substrate and wherein the polymerization of said monomer is initiated by first activating the said polymeric matrix component of the said substrate with an excess of aqueous hydrogen peroxide solution, washing the thus activated substrate with water to remove the excess hydrogen peroxide solution, forming an aqueous slurry of the activated substrate, and adding said monomer and a ferrous salt to the said aqueous slurry in such a manner as to cause the monomer to polymerise on to the activated polymer matrix to form the said copolymer.

2. A process according to claim 1 wherein said ferrous salt is ferrous sulphate.

3. A process according to claim 1 wherein the said functional monomer is selected from the group consisting of acrylamide, vinyl acetate, vinylbenzyl chloride, methyl acrylate, ethyl acrylate, acrylic acid, methacrylic acid, 2-vinylpyridine, 4-vinylpyridine, 2-methyl-5-vinylpyridine, 3-dimethylaminopropylacrylamide, 2-dimethylaminoethyl methacrylate, 2-diethylaminoethyl methacrylate, aminostyrene, ethylaminomethylstyrene, diethylaminomethylstyrene, 1-ethyl-4-vinylpyridinium-p-toluene sulphonate, 2-hydroxy-3-methyacrylyloxypropyl-trimethylammonium chloride, 2-methacrylyloxyethyltrimethylammonium methylsulphate, vinylbenzyl sulphonic acid and vinylbenzyl trimethylammonium chloride.

4. A process according to claim 1 wherein the said ferromagnetic material is selected from the group consisting of soft ferrites, hard ferrites, iron oxides, magnetite and chromium dioxide.

5. A process according to claim 1 wherein the said ferromagnetic material is a gamma-iron oxide.

6. A process according to claim 5 wherein the said ferromagnetic material is gamma —$Fe_2O_3$.

7. A process according to claim 1 wherein the said ferromagnetic material constitutes from 40 to 80% w/w of the said substrate.

8. A process according to claim 1 wherein the said polymeric matrix comprises polyvinyl alcohol.

9. A process according to claim 1 wherein the said polymeric matrix comprises polyacrylamide.

10. A process according to claim 1 wherein the said polymeric matrix is crosslinked at least in part.

11. A process according to claim 1 wherein the said substrate is spherical and wherein the said monomer is polymerized so as to provide a polymeric shell the thickness of which constitutes up to 25% of the diameter of the said substrate.

12. A process according to claim 1 and comprising additionally the step of chemically treating the said polymeric shell so as to impart a desired functionality to said shell.

* * * * *